United States Patent
Banasky

(10) Patent No.: US 7,137,799 B2
(45) Date of Patent: Nov. 21, 2006

(54) VESSEL AND SYSTEM FOR CURING A REPAIR TO A COMPONENT MADE FROM COMPOSITE MATERIALS

(76) Inventor: Howard Victor Banasky, 1401 N. 26th St., Renton, WA (US) 98056

( * ) Notice: Subject to any disclaimer, the term of this patent is extended or adjusted under 35 U.S.C. 154(b) by 270 days.

(21) Appl. No.: 10/630,645

(22) Filed: Jul. 29, 2003

(65) Prior Publication Data

US 2005/0022922 A1 Feb. 3, 2005

(51) Int. Cl.
*B29C 73/24* (2006.01)
*B29C 70/44* (2006.01)

(52) U.S. Cl. .................... 425/11; 156/382; 425/182; 425/389; 425/405.1

(58) Field of Classification Search ............ 425/182, 425/389, 405.1, 11; 156/382; 432/200, 432/250; 219/403, 440; 220/288
See application file for complete search history.

(56) References Cited

U.S. PATENT DOCUMENTS

| | | | | |
|---|---|---|---|---|
| 2,416,137 A | * | 2/1947 | Auxier et al. | 425/174.6 |
| 3,998,515 A | * | 12/1976 | Panek | 439/198 |
| 4,447,402 A | * | 5/1984 | Cox | 422/174 |
| 4,455,268 A | * | 6/1984 | Hinrichs et al. | 264/407 |
| 4,547,242 A | * | 10/1985 | Tusinski et al. | 156/105 |
| 4,576,776 A | * | 3/1986 | Anderson | 264/510 |
| 4,771,162 A | * | 9/1988 | Schatz et al. | 219/400 |
| 4,828,472 A | * | 5/1989 | Itoh et al. | 425/143 |
| 5,236,646 A | | 8/1993 | Cochran et al. | |
| 5,345,397 A | * | 9/1994 | Handel et al. | 700/274 |
| 5,529,654 A | * | 6/1996 | Kavanagh et al. | 156/229 |
| 5,863,452 A | * | 1/1999 | Harshberger et al. | 249/83 |
| 6,017,484 A | | 1/2000 | Hale | |
| 6,435,242 B1 | | 8/2002 | Reis et al. | |
| 2004/0177928 A1 | * | 9/2004 | Bivens | 156/359 |

OTHER PUBLICATIONS

International Search Report, Feb. 15, 2005.

\* cited by examiner

*Primary Examiner*—Robert B. Davis
(74) *Attorney, Agent, or Firm*—Graybeal Jackson Haley LLP

(57) ABSTRACT

The present invention provides a pressure vessel for exerting pressure on a repair to a component made of composite materials to cure the repair in the field. The pressure vessel includes a body having a chamber for receiving the repair to the component; a portal operable to permit a heating element of a heater located inside the chamber to be coupled with a power source located outside the chamber to power the heating element; and a pump operable to pressurize the chamber. By pressurizing the chamber, the pressure vessel may exert pressure on a repair placed inside the chamber that exceeds 14.7 psi, and thus, provide a better cure in the field to produce a stronger repair. Furthermore, the pressure vessel may be more easily transported from one location in the field to another than an autoclave.

16 Claims, 2 Drawing Sheets

VESSEL AND SYSTEM FOR CURING A REPAIR TO A COMPONENT MADE FROM COMPOSITE MATERIALS

BACKGROUND

Many different devices and/or structures, such as an aileron of an airplane wing, a flap on the trailing edge of an airplane wing, and a boat hull, include components manufactured with composite materials. One of the many reasons for this is that the components may be easily contoured into complex curves, like those found in a hull or leading edge of a flap, during the manufacture of the components. Another reason is that the components may be easily repaired in the field, and thus, the time spent completing a repair may be reduced.

Repairing a component with composite materials typically involves laying up two or more plies of material such as metal, woven and/or non-woven carbon, fiberglass, and/or Kevlar® fibers with an adhesive and then curing the adhesive to couple the two or more plies together and to couple the plies with the remainder of the component. To provide a strong repair, the adhesive should be properly cured; otherwise the repair and/or component could prematurely fail. Properly curing most conventional adhesives includes three elements: heating the adhesive, exerting pressure on the repair—typically about 200 psi—, and applying a vacuum to the repair. Heating the adhesive changes the adhesive's molecular structure to solidify and increase the material strength of the adhesive. Exerting pressure on the repair compacts the plies to increase the strength of the interlaminate bonds and increase the distribution of adhesive throughout the repair. And applying a vacuum draws out gas that would otherwise be trapped in the repair once the adhesive solidifies to reduce the number and size of voids in the cured adhesive. Although most conventional adhesives may be cured under a variety of different pressures, in general, as the pressure increases the strength of the repair increases.

Unfortunately, properly curing a repair to a component in the field is difficult because the amount of pressure that may be exerted on the repair is typically equal to or less than 14.7 psi. To cure a repair in the field, a heating blanket is typically placed on the repair, and then a bag is placed over the entire repair and sealed to the component. The air between the bag and the repair is then removed to generate a vacuum and the heating blanket is turned on to generate heat. Thus, the only pressure that is typically exerted on the repair is atmospheric pressure that results from the vacuum, which is about 14.7 psi.

A possible solution is to design a component that will withstand the stresses and strains encountered in service with a repair that does not contribute to the component's structural integrity. But this means that the component, when manufactured, will be more robust than is required. Consequently, the cost in material to manufacture the component and the weight of the component will be more than required to meet the expected stresses and strains encountered in service. This increase in cost and especially weight can be significant, for example, in an airplane predominately made of composite materials.

Another possible solution is to cure the repair in an autoclave, which is typically used to cure components during their manufacture. But using an autoclave in the field is often impractical because of its size. Most conventional autoclaves are expensive to build, and thus expensive to purchase, because they are designed to perform many complimentary curing functions. For example, most autoclaves are designed to pressurize an internal chamber to about 200 psi, and thus, specifically designed to withstand this pressure. Furthermore, most autoclaves include a pump or compressor to generate this pressure, a heater to heat the atmosphere, a fan to circulate the heated atmosphere, and a system to purge gases from the atmosphere, which may be released into the chamber as the adhesive cures. Consequently, most autoclaves are large to accommodate a wide range of component sizes.

The size of most autoclaves makes their use in the field impractical for many reasons. One reason is that large autoclaves are difficult to move from one location in the field to another. Another reason is that large autoclaves are expensive to operate because the volume of air that must be heated and circulated within the autoclave to cure a component and/or repair to a component is large. Consequently, about the same amount of power is required to cure a repair to a small component as a repair to a large component.

SUMMARY

The present invention provides a pressure vessel for exerting pressure on a repair to a component made of composite materials to cure the repair in the field. In one aspect of the invention, the pressure vessel includes a body having a chamber for receiving the repair to the component; a portal operable to permit a heating element located inside the chamber to be coupled with a power source located outside the chamber that provides power to the heating element; and a pump operable to pressurize the chamber. By pressurizing the chamber, the pressure vessel may exert pressure on a repair placed inside the chamber that exceeds 14.7 psi, and thus provide a better cure to produce a stronger repair. The portal allows one to cure a repair with a conventional heating element, such as a heating blanket, typically found in the field. By eliminating the other components and subsystems typically found in an autoclave, such as a heater to heat the atmosphere in the autoclave and a fan to circulate the atmosphere, the manufacturing cost and the size of the vessel may be reduced. Thus, the vessel may be more easily moved from one location to another.

In another aspect of the invention, the portal may include an interface that may releasably couple a heating element located inside the chamber of the vessel with the power source located outside the chamber. Furthermore, the interface may be removable from the portal and replaceable with a different interface. With the interface, the vessel may be used with many different types of heaters to cure a repair in the field.

DETAILED DESCRIPTION

The following discussion is presented to enable one skilled in the art to make and use the invention. Various modifications to the disclosed embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figure 1:
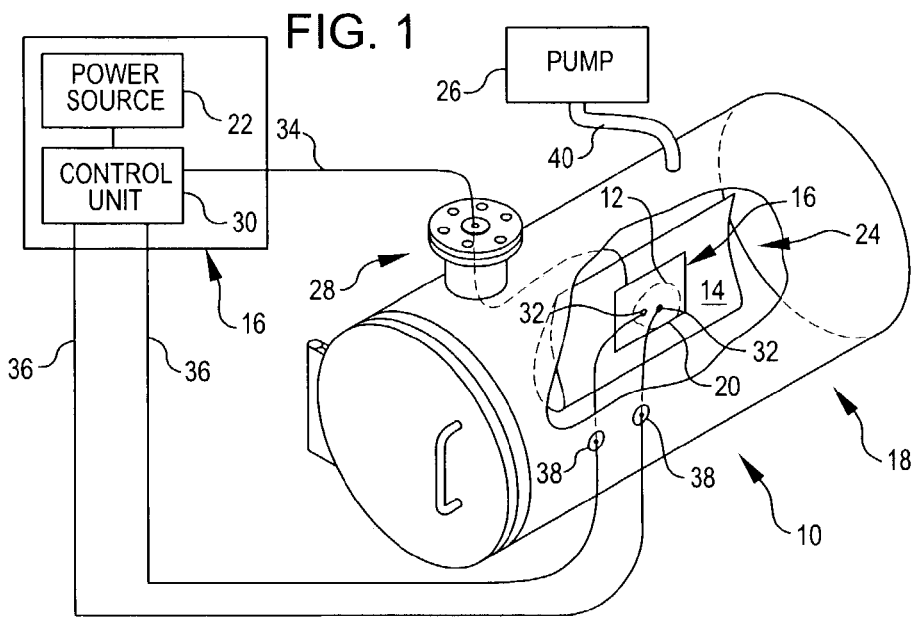
FIG. 1 is a perspective view of a system for curing, in the field, a repair to a component made of composite material, according to an embodiment of the invention.

FIG. 1 is a perspective view of a system 10 for curing, in the field, a repair 12 to a component 14 made of composite materials, according to an embodiment of the invention. The system 10 may also be used to cure a component (not shown) that is manufactured in the field. The system 10 includes a heater 16 to heat the repair 12 to a cure temperature—typically between about 250° F. and about 400° F. depending on the type of adhesive used in the repair at—which the adhesive (not shown) in the repair 12 will cure, and a pressure vessel 18 to exert pressure on the repair 12 as the repair 12 cures. With the pressure vessel 18, the system 10 may cure the repair 12 with a pressure greater than 14.7 psi, for example 60 psi, to increase the strength of the repair 12 compared to the strength typically obtained when only using a vacuum bag (not shown) to exert pressure on the repair 12.

The heater 16 of the system 10 includes a heating element 20, which may be coupled with the repair 12, to generate heat, and a power source 22 to power the heating element 20. The pressure vessel 18 of the system 10 includes a chamber 24 to receive the repair 12 or all of the component 14 that requires the repair 12, and a pump 26 coupled with the chamber 24 to pressurize the chamber 24 as desired. The pressure vessel 18 also includes a portal 28 to permit the power source 22 of the heater 16 to be located outside the chamber 24 while the heating element 20 heats the repair 12 inside the chamber 24. Thus, the vessel 18 may be used with many different types of heaters 16 having different heating capacities that are or may be found in the field. Furthermore, the vessel 18 may be smaller in size than a conventional autoclave to facilitate easy transportation of the vessel 18 from one location in the field to another.

Still referring to FIG. 1, in one embodiment, the heater 16 may include a control unit 30, for example an HCS9200B Single Zone manufactured by Heatcon® Composite Systems, to modify the amount and duration of the heat generated by the heating element 20, and temperature sensors 32 to sense the temperature of a region of the repair 12. The control unit 30 may be located outside the chamber 24 to protect its components from the hot, pressurized atmosphere inside the chamber 24 and may be coupled with the heating element 20 and power source 22 via the cord 34 and with the temperature sensors 32 via the wires 36. The heating element 20 may be any desired heating element, such as a conventional heating blanket for curing composites. To permit the temperature sensors 32 to be coupled with the control unit 30 located outside the chamber 24, the vessel 18 may include additional portals 38. As the system 10 cures the repair 12, the control unit 30 may monitor the temperature of the sensors 32 and may modify the power it provides the heating element 20 accordingly.

Still referring to FIG. 1, in one embodiment, the pressure vessel 18 may include a pump 26 located outside the chamber 24 and a line 40 to operatively couple the pump 26 with the chamber 24. The pump 26 may be any desired pump, such as a conventional pump capable of moving air or any other type of gas and/or liquid into the chamber 24 to pressurize the chamber 24. Locating the pump outside the chamber may be desirable to protect the components of the pump 26 from the hot, pressurized atmosphere inside the chamber 24. The pump 26 may also be releasably coupled with the chamber 24 to allow the vessel to be used with many different pumps having different capacities.

Other embodiments of the system 10 are contemplated. For example, the control unit 30 may be coupled with the pump 26 to modify the pressure generated in the chamber 24 and may be coupled to a pressure sensor located in the chamber 24 to monitor the pressure inside the chamber 24. In addition, the system 10 may include a vacuum source coupled with a vacuum bag that may be mounted on the repair 12 and/or the component 14 to draw out gas that would otherwise be trapped in the repair 12 once the adhesive solidifies. This may be desirable to reduce the number and size of voids in the cured adhesive. The vacuum source and bag may also exert pressure on the repair to permit a lower pressure inside the chamber 24 of the vessel 18 during a cure of the repair 12. Furthermore, the control unit 30 may be coupled with the vacuum bag and vacuum source to monitor and accordingly modify the vacuum generated between the bag and the repair 12 and/or component 14. In addition, the heater 16 may include more than or less than two temperature sensors 32, and the vessel 18 may include more than one portal 28 and more than or less than two portals 38. Also, the system 10 may include a purge sub-system to purge excessive nitrogen molecules or other molecules from the chamber 24 that may be released during a cure. Furthermore, the control unit 30 may be coupled with the purge sub-system to monitor the chamber's atmosphere and modify the operation of the purge sub-system accordingly.

Figure 2:
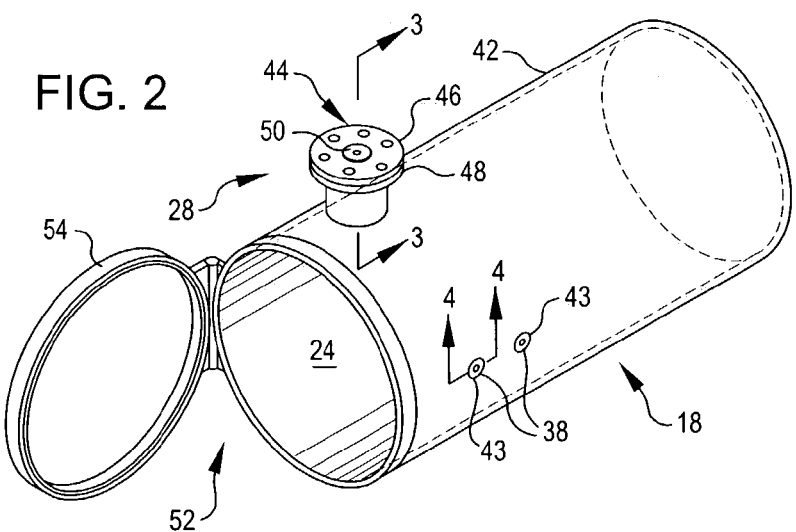
FIG. 2 is a perspective view of a pressure vessel included in the system of FIG. 1, according to an embodiment of the invention.

FIG. 2 is a perspective view of the pressure vessel 18 (pump 26 omitted for clarity) included in the system 10 of FIG. 1, according to an embodiment of the invention. Because the vessel 18 does not include most of the components and sub-systems that most autoclaves include, the vessel 18 is significantly less expensive to build than most autoclaves. Thus, the vessel 18 may be sized and shaped as desired to facilitate its re-location in the field and reduce the amount of power required to cure a repair to a component with pressure exceeding 14.7 psi.

In one embodiment, the vessel 18 may include a body 42 shaped like a cylinder and having the chamber 24 sized to accommodate long and narrow parts, such as a trailing edge flap for an airplane. For example, the body 42 may include a chamber 24 having a chamber diameter substantially equal to 20 inches and a chamber length substantially equal to 60 inches. In addition, the body 42 may be made of any desirable material capable of withstanding the desired pressures and heat in the chamber 24. For example, the body 42 may be made of a conventional metal for durability or a conventional plastic to minimize weight for mobility between different locations in the field.

Other embodiments of the vessel 18 are contemplated. For example, the body 42 may be shaped like a sphere to efficiently cure a small component and/or a repair to a small component and to facilitate relocation in the field. Because the vessel 18 is less expensive than most autoclaves, one may have a small vessel 18 shaped like a sphere to use when curing repair to a small component, and a large vessel 18 shaped like a cylinder to use when curing a repair to a large component. Thus, a repair to a small component may be cured with less expense than a repair to a large component.

Still referring to FIG. 2, the vessel 18 includes a portal 28 to permit the power source 22 (FIG. 1) of the heater 16 (FIG. 1) to be located outside the chamber 24 while the heating element 20 (FIG. 1) heats the repair 12 (FIG. 1) inside the chamber 24. The portal 28 may be located anywhere on the body 42 as desired. In one embodiment, the portal 28 may be located close to an end of the body 42 and may include an interface 44 to couple, releasably or not, the heating element 20 with the power source 22. The interface 44 may include a mount 46 to mount the interface 44 to a receiver 48 of the body 42, and a coupler 50 (discussed in greater detail in conjunction with FIG. 3) to couple the power source 22 with the heating element 20. The mount 46 may be removable from the receiver 48, as desired, to allow one to remove the interface 44 and replace it with a different interface. This may be desirable to allow different heating elements to be coupled with different power sources.

Other embodiments are contemplated. For example, the interface 44 may include a coupler to also couple additional devices located inside the chamber 24 with other devices located outside the chamber 24, such as the temperature sensors 32 (FIG. 1) with the control unit 30 (FIG. 1).

Still referring to FIG. 2, the vessel 18 may also include additional portals 38 to permit communication between a device located inside the chamber 24 and another device located outside the chamber 24. In one embodiment, the vessel 18 may include a first portal 28, and second and third portals 38 to permit temperature sensors 32 located inside the chamber 24 to be coupled with the control unit 22 located outside the chamber 24. The second and third portals 38 may be located anywhere on the body 42 as desired and may include a second and third interface 43, respectively, (discussed in greater detail in conjunction with FIG. 4) to couple the sensors 32 with the control unit 22.

Still referring to FIG. 2, the vessel 18 also includes an entry 52 to permit the insertion of the repair 12 to the component 14 into the chamber 24 to be cured. In one embodiment, the entry 52 may include a door 54 hingedly coupled with the body 42 to close the entry 52, and thus maintain the desired pressure in the chamber 24, while the repair 12 cures.

Figure 3:
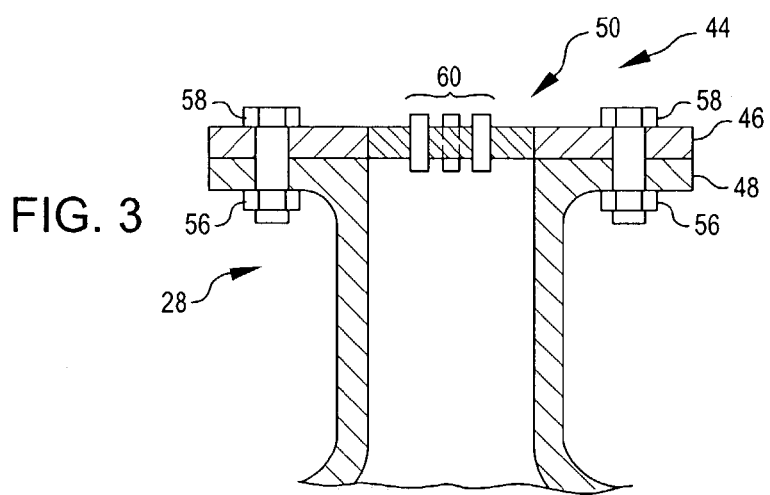
FIG. 3 is a cross-sectional view of a portal included in the pressure vessel of FIG. 2, according to an embodiment of the invention.

FIG. 3 is a cross-sectional view of the portal 28 included in the pressure vessel 18 of FIG. 2, according to an embodiment of the invention. To allow the vessel 18 to be used with many different combinations of heating elements and power sources as desired, the interface 44 of the portal 28 is removable and replaceable with another interface having a different coupler.

In one embodiment, the interface 44 may include the mount 46, which may be releasably mounted to the receiver 48 of the body 42 (FIG. 2) using any desired fastening technique. For example, nuts 56 may be threadingly coupled with bolts 58 to couple the mount 46 with the receiver 48. The interface 44 may also include the coupler 50 having a three-pronged plug 60 to couple the heating element 20 (FIG. 1) with a single phase, standard voltage power source that includes an electrical ground. If a different heating element 20 and/or different power source 22 is desired then one removes the interface 44 from the body 42 and mounts a different interface 44 having a different coupler 50. For example, the only available power source may provide high voltage, three-phase power. To be able to use power from this power source, a different heating element may be required which may require a different coupler.

Other embodiments are contemplated. For example, the coupler 50 may be removable from the interface 44 and replaceable with a different coupler 50.

Figure 4:
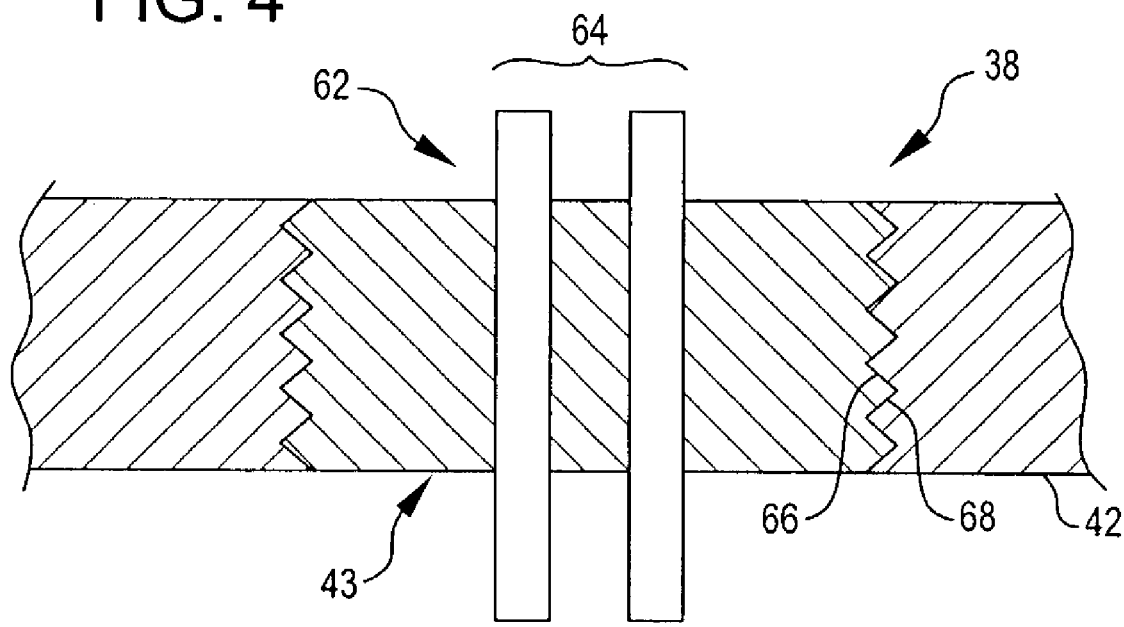
FIG. 4 is a cross-sectional view an additional portal included in the pressure vessel of FIG. 2, according to an embodiment of the invention.

FIG. 4 is a cross-sectional view an additional portal 38 included in the pressure vessel of FIG. 2, according to an embodiment of the invention. To allow the vessel 18 to be used with any desired additional devices and/or sub-systems for curing a repair to a component, the additional portal 38 includes a coupler 62 that may be removable from the body 42 and replaceable with another, different coupler 62. In one embodiment, the coupler 62 includes a double-pronged plug 64 to couple, releasably or not, the temperature sensor 32 (FIG. 1) with the control unit 22 (FIG. 1), and external threads 66 sized to correspond with internal threads 68 to removably fasten the coupler 62 with the body 42.

What is claimed is:

1. A pressure vessel for curing, in the field, a repair to a component made of composite materials, the vessel comprising:
    a body having a chamber operable to receive the repair to the component;
    a portal operable to permit a heating element located inside the chamber to be coupled with a power source located outside the chamber that provides power to the heating element, wherein the portal includes an interface operable to releasably couple the heating element with the power source; and
    a pump operable to pressurize the chamber.

2. The vessel of claim 1, wherein the pump is operable to generate at least one of the following pressures: 60 psi, less than 60 psi, and more than 60 psi.

3. The vessel of claim 1, wherein the chamber is operable to receive the component that has the repair.

4. The vessel of claim 1, wherein the chamber is substantially cylindrical.

5. The vessel of claim 1, wherein the chamber is substantially cylindrical and includes a chamber diameter of about 20 inches.

6. The vessel of claim 1, wherein the chamber is substantially cylindrical and includes a chamber diameter of about 20 inches and a chamber length of about 60 inches.

7. The vessel of claim 1 wherein the interface is removable from the portal and replaceable with a different interface.

8. The vessel of claim 1 wherein the interface is operable to releasably couple the heating element with a control unit that is located outside the chamber and operable to modify the amount of heat generated by the heating element.

9. The vessel of claim 1, wherein the vessel further comprises:
    a first portal operable to permit the heating element to be coupled with the power source;
    a second portal operable to permit a temperature sensor located inside in the chamber to be coupled with a control unit of the heater that is located outside the chamber and operable to modify the amount of heat generated by the heating element; and
    a third portal operable to permit another temperature sensor located inside the chamber to be coupled with the control unit.

10. The vessel of claim 1, further comprising an entry operable to permit the insertion of the repair into the chamber and the removal of the repair from the chamber.

11. The vessel of claim 10 wherein the entry includes a door hingedly coupled with the body and operable to close the entry while the repair cures.

12. A system for curing, in the field, a repair to a component made of composite materials, the system comprising:

a heater including a heating element operable to heat the repair to a cure temperature; and a pressure vessel including:

a body defining a chamber operable to receive the repair and the heating element;

a portal operable to permit the heating element to be coupled with a power source located outside the chamber that provides power to the heating element, wherein the portal includes an interface operable to releasably couple the heating element with the power source; and a pump operable to pressurize the chamber.

13. The system of claim 12 wherein:

the heater includes a control unit located outside the chamber and operable to modify the amount of heat generated by the heating element; and the portal is operable to permit the heating element to be coupled with the control unit.

14. The system of claim 12 wherein:

the heater includes at least two temperature sensors located in the chamber, and a control unit located outside the chamber that is operable to monitor the temperatures of the sensors and modify the amount of heat generated by the heating element according to the temperatures of the sensors; and the portal is operable to permit the temperature sensors to be coupled with the control unit.

15. The system of claim 12 wherein:

the heater includes at least two temperature sensors located in the chamber, and a control unit located outside the chamber that is operable to monitor the temperatures of the sensors and modify the amount of heat generated by the heating element according to the temperatures of the sensors; and the vessel includes:

a first portal operable to permit the heating element to be coupled with the power source, a second portal operable to permit a temperature sensor to be coupled with the control unit, a third portal operable to permit another temperature sensor to be coupled with the control unit.

16. The system of claim 12 wherein the pump is located outside the chamber.

* * * * *